(12) United States Patent
Barone et al.

(10) Patent No.: US 7,236,169 B2
(45) Date of Patent: Jun. 26, 2007

(54) GEOMETRIC PROCESSING STAGE FOR A PIPELINED GRAPHIC ENGINE, CORRESPONDING METHOD AND COMPUTER PROGRAM PRODUCT THEREFOR

(75) Inventors: Massimiliano Barone, Bresso (IT); Danilo Pietro Pau, Sesto San Giovanni (IT); Pierluigi Gardella, Montanaso Lombardo (IT); Simon James Goda, Bristol (GB); Stephen Adrian Hill, Bath (GB); Gary James Sweet, Bristol (GB); Mathieu Robart, Bristol (GB)

(73) Assignees: STMicroelectronics S.r.l., Agrate Brianza (IT); STMicroelectronics Ltd., Bristol (GB)

( * ) Notice: Subject to any disclaimer, the term of this patent is extended or adjusted under 35 U.S.C. 154(b) by 312 days.

(21) Appl. No.: 10/886,939

(22) Filed: Jul. 7, 2004

(65) Prior Publication Data

US 2005/0190183 A1 Sep. 1, 2005

(30) Foreign Application Priority Data

Jul. 7, 2003 (EP) .................................. 03015270

(51) Int. Cl.
*G06T 15/20* (2006.01)
*G06T 15/30* (2006.01)

(52) U.S. Cl. ...................................... 345/421; 345/427
(58) Field of Classification Search ................ 708/490, 708/501, 523, 524, 603, 607
See application file for complete search history.

(56) References Cited

U.S. PATENT DOCUMENTS

| | | | | |
|---|---|---|---|---|
| 5,926,182 A | * | 7/1999 | Menon et al. | 345/421 |
| 6,411,301 B1 | * | 6/2002 | Parikh et al. | 345/522 |
| 6,414,683 B1 | * | 7/2002 | Gueziec | 345/428 |
| 6,618,048 B1 | * | 9/2003 | Leather | 345/422 |
| 6,774,895 B1 | * | 8/2004 | Papakipos et al. | 345/422 |
| 6,940,525 B2 | * | 9/2005 | Hochmuth et al. | 345/619 |
| 7,027,059 B2 | * | 4/2006 | Hux et al. | 345/543 |
| 2002/0030693 A1 | | 3/2002 | Baldwin | 345/620 |
| 2002/0118188 A1 | | 8/2002 | Zviaguina et al. | 345/421 |
| 2003/0001851 A1 | | 1/2003 | Bushey | 345/506 |

* cited by examiner

*Primary Examiner*—Mark Zimmerman
*Assistant Examiner*—Andrew Yang
(74) *Attorney, Agent, or Firm*—Lisa K. Jorgenson; Dennis M. de Guzman; Seed IP Law Group PLLC

(57) ABSTRACT

A geometric processing stage for a pipelined engine for processing video signals and generating processed video signal in space coordinates (S) adapted for display on a screen. The geometric processing stage includes: a model view module for generating projection coordinates of primitives of the video signals in a view space, said primitives including visible and non-visible primitives, a back face culling module arranged downstream of the model view module for at least partially eliminating the non visible primitives, a projection transform module for transforming the coordinates of the video signals from view space coordinates into normalized projection coordinates (P), and a perspective divide module for transforming the coordinates of the video signals from normalized projection (P) coordinates into screen space coordinates (S). The back face culling module is arranged downstream the projection transform module and operates on normalized projection (P) coordinates of said primitives. The perspective divide module is arranged downstream the back face culling module for transforming the coordinates of the video signals from normalized projection (P) coordinates into screen space coordinates (S). A circuit in the back face culling module can be shared with a standard three dimension back face culling operation when necessary. An application is in graphic engines using standard graphics language like OpenGL and NokiaGL.

31 Claims, 4 Drawing Sheets

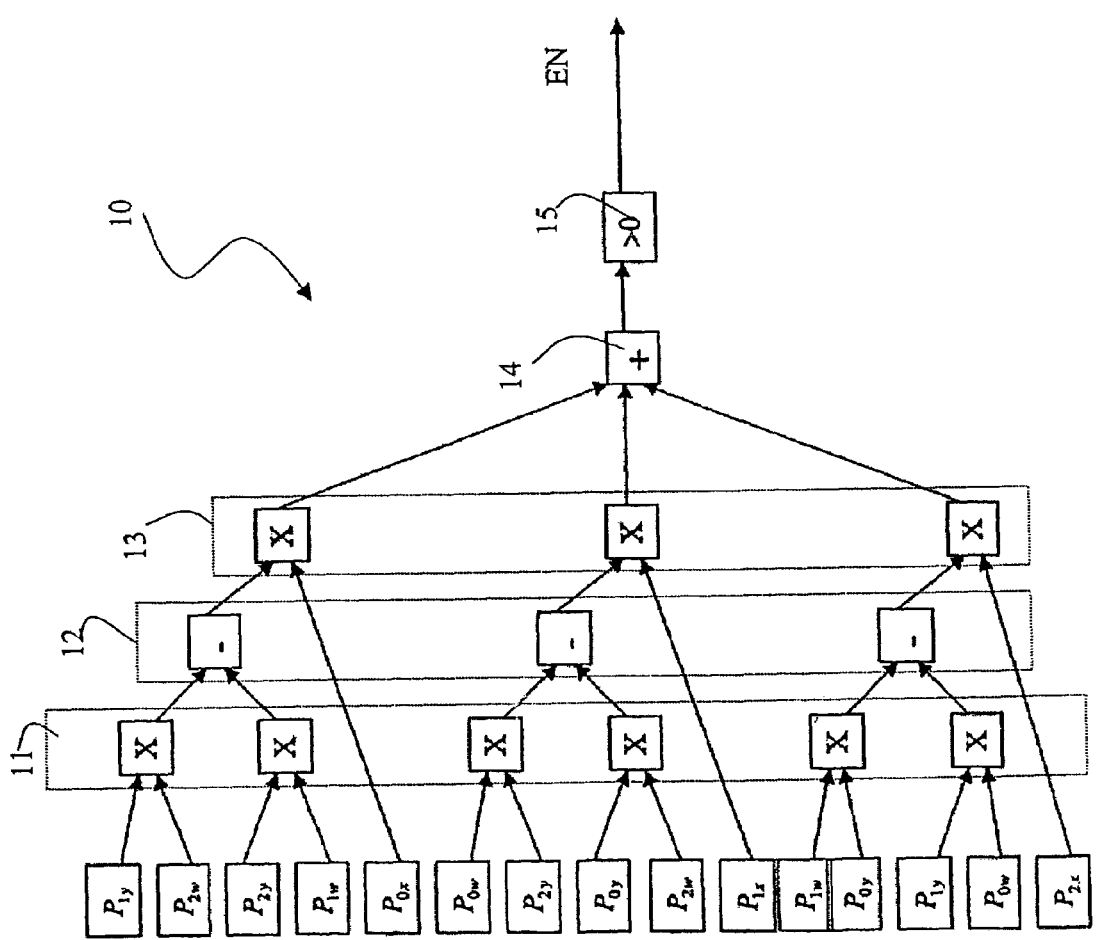

GEOMETRIC PROCESSING STAGE FOR A PIPELINED GRAPHIC ENGINE, CORRESPONDING METHOD AND COMPUTER PROGRAM PRODUCT THEREFOR

BACKGROUND OF THE INVENTION

1. Field of the Invention

The present disclosure relates generally to techniques for triangle culling in pipelined 3D graphic engines and was developed by paying specific attention to the possible application to graphic engines that operate in association with graphic languages.

Exemplary of such an application are the graphic engines operating in association with e.g., OpenGL, NokiaGL and Direct3D, in particular but not exclusively in mobile phones.

However, reference to this preferred application is in no way to be construed as limiting the scope of the invention.

2. Description of the Related Art

Modern 3D graphic pipelines for graphic engines in graphic cards include a rich set of features for synthesizing interactive three-dimensional scenes with a high and realistic quality.

Nowadays, in order to output frame-rates ranging from 30 to 100 frames per second, powerful dedicated graphic cards are required having correspondingly high costs. The number of pictures per time unit is increased usually by parallelizing—inasmuch as possible—all the operations involved in the process of designing in the frame buffer those graphic objects that are to be displayed while at the same time increasing the computational power available by performing at higher speeds those operations that cannot be parallelized.

A description of an OpenGL pipeline for 3D interactive graphics is given in a co-pending European Patent application filed on the same day and in the name of one of the Applicants herein, entitled "Graphic system comprising a pipelined graphic engine, pipelining method and computer program product". Such a patent application, whose contents are herein incorporated by reference, describes graphical operations performed in a geometry stage comprised in the graphic engine. In particular, a back-face culling operation is described.

In the back-face culling operation, it is very convenient to cull the triangles at an earlier stage of the pipeline since this will appreciably decrease the "potentially visible triangles" submitted to later stages and the processing needed. Assuming that a 3D model is composed by triangles within the unit cube (which means that they are potentially visible), triangles can be of two types: those triangles that are visible for the observer and those that are not visible. "Back-face culling" is able to remove from the list of potentially visible triangles those of "back-face" type. For symmetric objects, 50% of the triangles are front facing and the other 50% are back facing. The ability of removing 50% of the triangles leads to avoiding all subsequent pipeline computations on their vertexes. Consequently, it is convenient to apply this technique as early as possible within a 3D pipeline.

In FIG. 1 a block diagram of a geometry stage 111 is shown.

The structure of the geometry stage 111 can be better understood by referring to the different space coordinates that are used and implemented by its modules.

One of the primary roles of the pipelined graphic system is to transform coordinates from the 3D space used in an application scene/stage into the 2D space of the final display unit.

This transformation normally involves several intermediate coordinate systems, namely:

the modeling space: the modeling space is the space in which individual elements in a model are defined. These are usually the "natural" coordinates for an object. For example, a sphere may be defined as having unit radius and be centered at the origin in the modeling coordinates. Subsequent scaling and translation would position and resize the sphere appropriately within a scene;

the world space: this represents the coordinate system of the final scene prior to viewing. OpenGL does not support an explicit notion of world space separate from view space, but some other graphics systems do (e.g., Direct3D, GKS 3D);

the view space: the view space has the synthetic camera as its origin, with the view direction along the z-axis. The view space coordinates are obtained from the modeling space via a model-view transformation. This coordinate system is sometimes referred to as "eye space";

the normalized projection space: here the coordinates are projected into a canonical space via the projection transformation. It is a four dimensional space where each coordinate is represented by (x, y, z, w). The view volume represents the region of the model visible to the synthetic camera. It is bounded by six planes, for example z=0, z=w, y=−w, y=w, x=−w, x=w. A perspective projection results in a view volume that is a frustum;

the normalized device space: the normalized projection coordinates are converted into normalized device coordinates by dividing the first three coordinates (x, y, z) by the fourth w coordinate to obtain (x/w, y/w, z/w). The values of the resulting coordinates normally lie in the range −1 to 1 or from 0 to 1 in the case of the z coordinate;

the screen space: this space corresponds to the coordinates used to address the physical displaying device.

Thus, the geometry stage 111 comprises in the first place a model view transform module, indicated with a block 201.

The model view transform module 201 processes graphic information I in form of either triangles or their vertexes, and applies the model-view matrix to the vertexes.

Each vertex is multiplied by a 4×4 transform matrix in order to rotate or translate or scale or skew it. Each vertex is represented by four coordinates (x,y,z,w), where w=1.

Such a four coordinates system defines a homogeneous coordinate space and it is very convenient since points and vectors may be processed from a mathematical point of view with the same 4×4 matrices.

For example, a 3D transform is implemented as:

$$P\_new = MP\_old + T$$

where M is a matrix for rotation, scaling and skewing, T represents a translation operator, P_old indicates a coordinate of a vertex before transformation and P_new indicates a coordinate of the vertex after transformation.

It is not possible to have only a matrix in this case.

A four dimensional transform is implemented as:

$$P\_new = \begin{bmatrix} M & T \\ 0 & 1 \end{bmatrix} P\_old = M^1 P\_old$$

$M^1$ indicates a rototranslation matrix and is possible to have only one of such matrixes. In this space the vertex positions are represented by quadruples of the type (x, y, z, 1), where the value 1 is allotted to the w coordinate for convenience, and vectors are represented by quadruples of the type (x, y, z, 0), which can be thought of as a point at infinity.

The output of the module 201 is a new vertex that contains the coordinates and normals transformed into view space. This space is suitable for lighting and fog calculations in a lighting module 202 and a fog module 203. The lighting module 202 performs a vertex operation to calculate color on the basis of the source light and its material property. The fogging module 203 performs a vertex operation to calculate its color knowing the fog characteristic.

A projection transform module 204 is provided further downstream to transform the coordinates in the view space into normalized projection coordinates. The projection transform module 204 is designed to process either vertexes or triangles.

The projection transform module 204 is followed by a primitive assembly module 205 that is responsible for assembling collections of vertexes into primitives. In this case, primitives are triangles. The primitive assembly module 205 must know what kinds of primitives are being assembled and how many vertexes have been submitted. For example, when assembling triangles, every third vertex triggers the creation of a new triangle and resets a vertex counter.

A frustum culling module 206 follows that operates by rejecting triangles lying outside the viewing region. Module 206 operates in normalized projection coordinates. A vertex having coordinates (x, y, z, w) is outside the frustum if: x>w, x<−w, y>w, y<−w, Z>w or z<−w, and a triangle lies outside of the frustum if all its vertexes lie on one side of the frustum (i.e., all above, below, to the left, right, in front or behind).

The pipelined frustum culling module 206 uses the notion of "outcodes" derived e.g., from the Cohen-Sutherland line clipping algorithm, as described for instance in the publication by I. Sutherland, "*Reentrant polygon clipping*" CACM, 17(1), January 1974, 32-42.

An outcode is here a 6-bit set of flags indicating the relationship of a vertex to the viewing frustum. If the outcodes of all three vertexes are zero, then the triangle is wholly within the frustum and must be retained. If the conjunction of the outcodes is non-zero, then all three vertexes must lie to one side of the frustum and the geometry must be culled. Otherwise the geometry must be retained, even though it may not actually overlap the view volume.

The outcodes are useful in the pipeline for a clipper module 207 that follows.

The clipper module 207, performs clipping to the viewing frustum as a pipeline of clips against its bounding planes. Clipping is necessary for several reasons. It is necessary for the efficiency of a rasterization stage 112 that follow geometric stage 111 to eliminate regions of polygons that lie outside the viewing frustum. Moreover, clipping against the near plane prevents vertexes with a coordinate w equal to zero being passed on to a subsequent perspective divide module 208. Clipping also bounds the coordinates that will be passed to the rasterization stage 112 allowing fixed precision operation in that module.

The clipping module as implemented increases the view volume slightly before applying the clips. This prevents artifacts from appearing at the edges of the screen, but implies that the rasterization stage 112 must cope with coordinates that are not strictly bounded by the device coordinates. The clips performed are against w>=near, z<=w, x>=−w', x<=w' and y<=w', where w' is w multiplied by a guard factor. Each clip is implemented as a specialization of a generic plane-clipping device. It is important to apply the clip to the near clipping plane first since this guarantees that further clips do not result in divide by zero.

The clipper module 207 is followed by the perspective divide module 208 already mentioned in the foregoing. The module 208 converts normalized projection coordinates into normalized device coordinates (x/w, y/w, z/w, 1).

Then, in the geometry stage 111 a back face culling module 209 is provided. Back face culling, as already mentioned, is a cheap and efficient method for eliminating geometry. In a polygonal solid, it is possible to enumerate each face such that the vertexes appear in a consistent winding order when they are visible. The choice of direction is arbitrary and OpenGL language, for instance, allows the desired order to be specified. Once the polygons have been projected into normalized device coordinates space, the sign of the cross product between two non co-linear edges establishes the orientation of a polygon. This can then be used to reject those polygons that face away from the viewer. The cross product need not consider the z coordinate since all z values are now equal to the distance to the projection plane. Thus, the test is very simple.

For concave solids, front facing polygons may not be all visible. Back-face culling is not appropriate for transparent objects where back faces may well be visible.

In the OpenGL pipeline, it is possible to assign different material properties to each side of a primitive. In this case, culling should be disabled. However, the back face calculation is still required in order to select the material that should be applied. In most pipeline configurations, this causes problems since it is not known at lighting time if a face is front or back facing necessitating double the lighting calculations and extra color information in each vertex.

Backface culling typically leads to roughly half of the polygons in a scene being eliminated. Since the decision is local to each polygon, it does not eliminate polygons that are obscured by other polygons.

Backface culling must be consistent with rasterization. If the back face culling module 209 eliminates polygons that should be rendered, then holes will appear in the final display.

Moreover, it is important to also cull polygons that should not be rendered. The latter case is more subtle. An incorrect implementation can lead to artifacts at the edge of transparent objects whose back-faces have not been properly culled.

The back face culling module 209 processes normalized device coordinates, even if it could operate equally well in screen space, where results are likely to be more consistent with the rasterizer. However in a circuital implementation, the calculations in the screen space would be fixed-point rather than floating-point as used in device coordinates. The only disadvantage is that viewport transforms in a subsequent viewport transform module 210 cannot be avoided.

The module 210 converts vertexes from normalized device coordinates into screen coordinates. The x and y coordinates are mapped to lie within a specified viewport and the z coordinate is mapped to lie within the range specified by the depth-range application programming interface (API) call. By default, z lies in the range 0 to 1.

In OpenGL, the rasterization stage 112 is designed to sample the geometry at the center of each pixel i.e., coordinates (0.5, 0.5), (1.5, 0.5)

From the point of view of the back face culling operation performed in the module 209, the geometry stage 111 shown in FIG. 1 effects a bidimensional back face culling into the screen space. Back face culling is performed after i.e., downstream the perspective division in module 208, i.e., only in two dimensions.

In FIG. 2 a schematic view of the vectors involved is shown.

Specifically, a triangle TR is shown along with its triangle normal vector TN, i.e., the vector that is normal to the triangle surface. An eye-point WP is shown associated to an eye-point vector V. A projected normal vector N, i.e., the projection of the normal vector TN in the direction of the eye-point vector V is also shown.

To calculate the normal projected vector N, two triangle edges $T_1$ and $T_2$ are necessary, since the normal projected vector N is the cross product between two triangle edge vectors. The sign of the normal projected vector N depends on the orientation of $T_1$ and $T_2$.

Conventionally, the sign is defined on the basis of the order of triangle vertexes. The first vector is from the first vertex toward the second vertex. The second vector is from the second vertex toward the third vertex. The eye-point vector V is drawn from the eye-point PW toward one of the triangle vertexes.

The projected normal vector N on the eye-point vector V is the inner (i.e., dot) product of the two vectors $T_1$ and $T_2$ divided by the module of the eye-point vector V. The division by the module of the eye-point vector V is, however, not necessary because this needed only for testing the sign of the projection vector N.

If the sign of the dot product operation is positive, then the triangle is visible.

In the case shown in FIG. 2, the normal vector TN is orthogonal to the screen and parallel to the eye-point vector V, so that the dot product is not necessary and only the z component of their cross (i.e., outer) product exists, namely the projected normal vector N.

If the sign of the z component is positive, then the triangle is visible.

Specifically, the first triangle edge vector $T_1$ is notated $T_1 = (T_{1x}, T_{1y})$, while $T_2$ is notated $T_2 = (T_{2x}, T_{2y})$ so that their cross product, corresponding to the projected normal vector N, is $N = T_1 \times T_2 = T_{1x} T_{2y} - T_{1y} T_{2x}$.

This method requires only two multiplications and one algebraic sum for each triangle; however it is possible to perform culling only at the end stage of the pipeline: consequently, the triangles that are not visible are eliminated at a very late stage and the resulting pipeline is not efficient.

FIG. 3 shows a block diagram of a geometry stage 111a having a different arrangement of the various processing modules with respect to the geometry stage 111 described with reference to FIG. 1. In fact in the geometry stage 111a the model view transform module 201 is followed by the primitive assembly module 205, with the back face culling module 209 cascaded thereto. Downstream of the back face culling module 209, the projection transform module 204, the frustum culling module 206, the lighting 202 and fog 203 modules, the clipper module 207 and the perspective divide module 208 are arranged. The view port transform module 210 is finally located before (i.e., upstream) the rasterization stage 112.

In such a configuration of the geometry stage 111a, three-dimensional back face culling is performed in the view space. This arrangement involves a great number of operations, but makes it possible to perform back face culling at the beginning of the geometry stage 111a.

The computation of the projected normal vector N is schematically shown in FIG. 4. The first triangle edge vector $T_1$ is notated $T_1 = (T_{1x}, T_{1y}, T_{1z})$ while the second triangle edge vector $T_2$ is notated $T_2 = (T_{2x}, T_{2y}, T_{2z})$. The cross product, corresponding to the projected normal vector N is thus:

$$N = T_1 \times T_2 = (T_{1y}T_{2z} - T_{1z}T_{2y}, T_{1x}T_{2z} - T_{1z}T_{2x}, T_{1x}T_{2y} - T_{1y}T_{2x})$$

$N_x$, $N_y$, $N_z$ are the components of the normal vector TN, and $V_x$, $V_y$, $V_z$ are the components of the eye-point vector V. Consequently:

$$N = TN \cdot V = N_x V_x + N_y V_y + N_z V_z = V_x(T_{1y}T_{2z} - T_{1z}T_{2y}) + V_y(T_{1x}T_{2z} - T_{1z}T_{2x}) + V_z(T_{1x}T_{2y} - T_{1y}T_{2x}).$$

This arrangement, where triangles are culled at an early stage of the pipeline, requires nine multiplications and five algebraic sums for each triangle.

Thus, neither the geometry stage 111 of FIG. 1, nor the geometry stage 111a of FIG. 3 significantly reduce the overall mathematical operation count and number of primitives, i.e., triangles, to be processed by the 3D pipeline.

BRIEF SUMMARY OF THE INVENTION

One embodiment of the present invention provides a geometric processing stage for a pipelined graphic engine, wherein the overall mathematical operation count and number of primitives, i.e., triangles, to be processed is significantly reduced without appreciably affecting the accuracy of the results obtained and the speed of processing.

Embodiments of the invention also relate to a corresponding method, as well as to a computer program product loadable in the memory of a computer and comprising software code portions for performing the method of the invention when the product is run on a computer.

Substantially, the arrangement described herein provides a graphic engine comprising a geometric processing stage that performs back face culling after the projection transform, i.e., in four dimensions. The arrangement described herein exploits the relationship between the screen space and the projection space established by the perspective division in order to lower complexity of calculation.

As result, an appreciable reduction is achieved in comparison with the prior art in terms of operation count and number of primitives to be processed.

A further advantage is the possibility of hardware implementation in a form adapted both to 3D back face culling and 4D back face culling: a geometry stage adapted for use with different graphics language can be implemented with a reduction of hardware. Finally, the arrangement described herein gives rise to a back face culling module able to deal in a simplified manner with four dimensions coordinates.

One embodiment provides a geometric processing stage for a pipeline engine for processing video signals and generating therefrom processed video signal in space coordinates (S) adapted for display on a screen, said geometric processing stage including:

a model view module for generating projection coordinates of primitives of said video signals in a view space, said primitives including visible and non-visible primitives;

a back face culling module arranged downstream of said model view module for at least partially eliminating said non-visible primitives;

a projection transform module for transforming coordinates of said video signals from said view space coordinates into normalized projection coordinates (P); and a perspective divide module for transforming coordinates of said video signals from said normalized projection (P) coordinates into said screen space coordinates (S);

wherein;

said back face culling module is arranged downstream of said projection transform module and operates on normalized projection (P) coordinates of said primitives;

said perspective divide module is arranged downstream said back face culling module for transforming the coordinates of said video signals from said normalized projection (P) coordinates into said screen space coordinates (S); and said back face culling module is configured for performing a perspective division (S=P/Pw) for transforming said screen coordinates (S) into said normalized projection (P) coordinates.

Another embodiment provides a method of processing video signals and generating therefrom processed video signal in space coordinates (S) adapted for display on a screen, said method including:

generating projection coordinates of primitives of said video signals in a view space, said primitives including visible and non-visible primitives;

back face culling said primitives for at least partially eliminating said non-visible primitives;

transforming coordinates of said video signals from said view space coordinates into normalized projection coordinates (P);

transforming coordinates of said video signals from said normalized projection (P) coordinates into said screen space coordinates (S);

operating said back face culling on said normalized projection (P) coordinates of said primitives; and transforming coordinates of said video signals as resulting from said back face culling from said normalized projection (P) coordinates into said screen space coordinates (S), wherein said back face culling includes perspective dividing (S=P/Pw) for transforming said screen coordinates (S) into said normalized projection (P) coordinates.

Still another embodiment provides apparatus to generate a processed video signal in space coordinates, the apparatus including:

a first module to generate projection coordinates of primitives of the video signal in a view space;

a second module operatively coupled downstream of the first module to transform coordinates of the video signal from the view space into normalized projection coordinates;

a third module operatively coupled downstream of the second module to operate on the normalized projection coordinates of the primitives using back face culling, wherein the third module is configured to perform perspective division; and a fourth module operatively coupled downstream of the third module to transform coordinates of the video signal, as resulting from the back face culling, from the normalized projection coordinates into screen space coordinates.

Yet another embodiment provides method to process a video signal, the method including:

generating projection coordinates of primitives of the video signal in a view space;

transforming coordinates of the video signal from the view space into normalized projection coordinates;

operating on the normalized projection coordinates of the primitives using back face culling, wherein using back face culling includes performing perspective division; and transforming coordinates of the video signal, as resulting from the back face culling, from the normalized projection coordinates into screen space coordinates.

BRIEF DESCRIPTION OF THE DRAWINGS

The invention will now be described, purely by way of non-limiting examples, with reference to the attached drawings, wherein:

FIG. 6 represents an embodiment of a circuit implementation of part of the geometry stage shown in FIG. 5.

DETAILED DESCRIPTION

Embodiments of a geometric processing stage for a pipelined graphic engine, corresponding method and computer program product therefor are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the arrangement described herein, the back face culling operation is performed on normalized projection coordinates, after the projection transform, so that calculation takes place in four dimensions.

Figure 5:
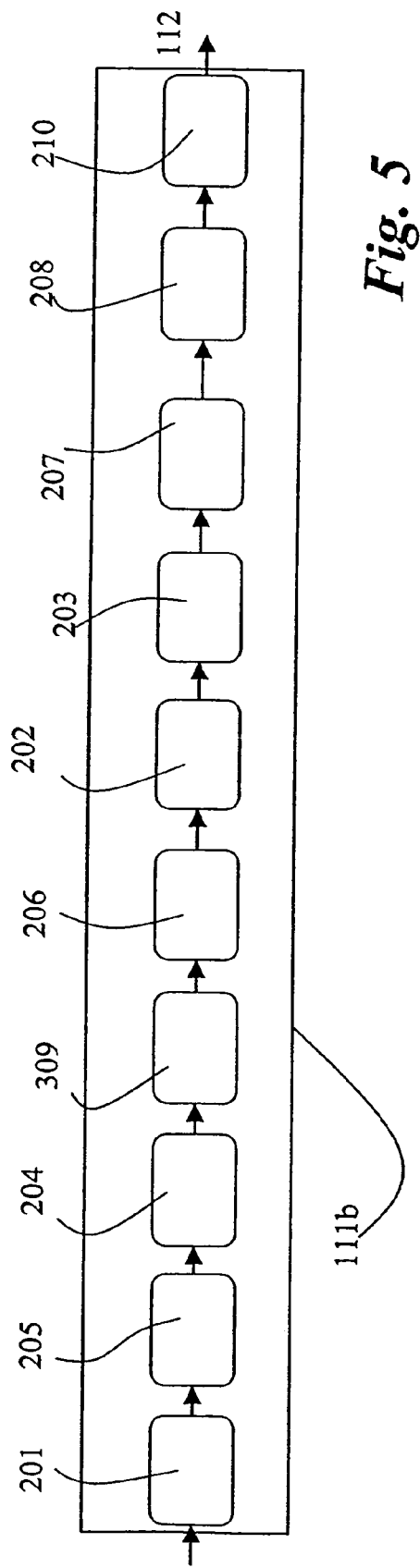
FIG. 5 represents a block diagram of a geometry stage of a graphic system according to one embodiment of the invention.

Accordingly, a block diagram of a geometry stage 111b is shown in FIG. 5.

Such a geometry stage 111b comprises a model view transform module 201, followed by a projection transform module 204 and a primitive assembly module 205.

A back face culling module 309 is then provided, the module 309 operating—as better detailed in the following—on normalized projection coordinates as generated by the projection transform module 204.

Downstream of the back face culling module 309, a frustum culling module 206, lighting and fog modules 202 and 203, a clipper module 207, and a perspective divide module 208 are arranged. A view port transform module 210 is arranged at the end of the geometry stage 111b upstream of the rasterization stage 112.

The same reference numerals already appearing in FIGS. 1 to 4 having been used in connection with FIG. 5 is intended to highlight that the modules designated 201 to 208, and 210 in FIG. 5 operate according to well known principles as described in the previous sections of this description.

Therefore, this section of present description will primarily deal with operation of the module designated 309.

As indicated, calculation of the cross product and the dot product of four dimensional vectors as originated by the projection transform module 204 is rather complex and requires an extensive amount of operations.

The geometry stage 111b described herein exploits—in order to simplify calculations—the existing relationship between the screen space and the projection space represented by the perspective division operation.

Such a relationship may be expressed as:

$$S = P/P_w$$

where S represents a screen space coordinate, P is a projection space coordinate and $P_w$ represents the homogeneous coordinate of homogeneous coordinates $(P_x, P_y, P_z, P_w)$.

Thus, the following relationships apply for the first and second triangle edge vectors $T_1$ and $T_2$ expressed in screen coordinates:

$$T_1 = (T_{1x}, T_{1y}) = ((S_{1x} - S_{Ox}), (S_{1Y} - S_{Oy}))$$

$$T_2 = (T_{2x}, T_{2y}) = ((S_{2X} - S_{1X}), (S_{2Y} - S_{1Y}))$$

The cross product between $T_1$ and $T_2$, that yields the projected normal vector N is thus:

$$N = T_1 \times T_2 = (T_{1x}T_{2y} - T_{1y}T_{2x}) = ((S_{1x} - S_{Ox})(S_{2y} - S_{1y}) - (S_{1y} - S_{Oy})(S_{2x} - S_{1x}))$$

where the vertexes expressed in screen coordinates are generally notated "S" with the respective suffixes.

The screen coordinate vertexes can be substituted by homologous projection coordinate vertexes by exploiting the relationship $S = P/P_w$.

By so doing the following relationship will result:

$$N = T_1 \times T_2 = \left(\left(\frac{P_{1x}}{P_{1w}} - \frac{P_{0x}}{P_{0w}}\right)\left(\frac{P_{2y}}{P_{2w}} - \frac{P_{1y}}{P_{1w}}\right) - \left(\frac{P_{1y}}{P_{1w}} - \frac{P_{0y}}{P_{0w}}\right)\left(\frac{P_{2x}}{P_{2w}} - \frac{P_{1x}}{P_{1w}}\right)\right)$$

where the vertexes expressed in projection coordinates are generally notated "P" with the respective suffixes.

The formula above is algebraically equivalent to the following:

$$P_{0w}P_{1w}P_{2w}N = (P_{0x}(P_{1y}P_{2w} - P_{1w}P_{2y}) + P_{1x}(P_{0w}P_{2y} - P_{0y}P_{2w}) + P_{2x}(P_{1w}P_{0y} - P_{1y}P_{0w}))$$

This is in fact the determinant for the following matrix:

$$P_{0w}P_{1w}P_{2w}N = \text{Det}\begin{vmatrix} P_{0x} & P_{1x} & P_{2x} \\ P_{0y} & P_{1y} & P_{2y} \\ P_{0w} & P_{1w} & P_{2w} \end{vmatrix}$$

Besides, $P_w = -Z$ for the homogeneous coordinate where Z is the z component in the view space.

Also, $z < 0$ inside the frustum, hence $P_w > 0$ means sign $(P_{0w}P_{1w}P_{2w}N) = \text{sign}(N)$. If the sign of the projected normal vector N, sign(N), is positive, then the triangle is visible.

FIG. 6 shows a schematic diagram of an embodiment of a possible circuit implementation of the cross calculation.

The vertex coordinates expressed in projection coordinates P are sent to a layer of multipliers 11, that yield the subproducts $P_{1y}P_{2w}$, $P_{1w}P_{2y}$, $P_{0w}P_{2y}$, $P_{0y}P_{2w}$, $P_{1w}P_{0y}$, $P_{1y}P_{0w}$.

Such subproducts are then sent to three corresponding subtraction nodes 12, whose outputs are multiplied by the coordinates $P_{0x}$, $P_{1x}$ and $P_{2x}$ respectively in a further layer of three multipliers 13.

Finally, a summation node 14 produces the final value of the projected normal vector N. A comparison block 15 evaluates if such value is positive, and in that case an enable signal EN is issued for the current triangle towards the next module.

Figure 1:
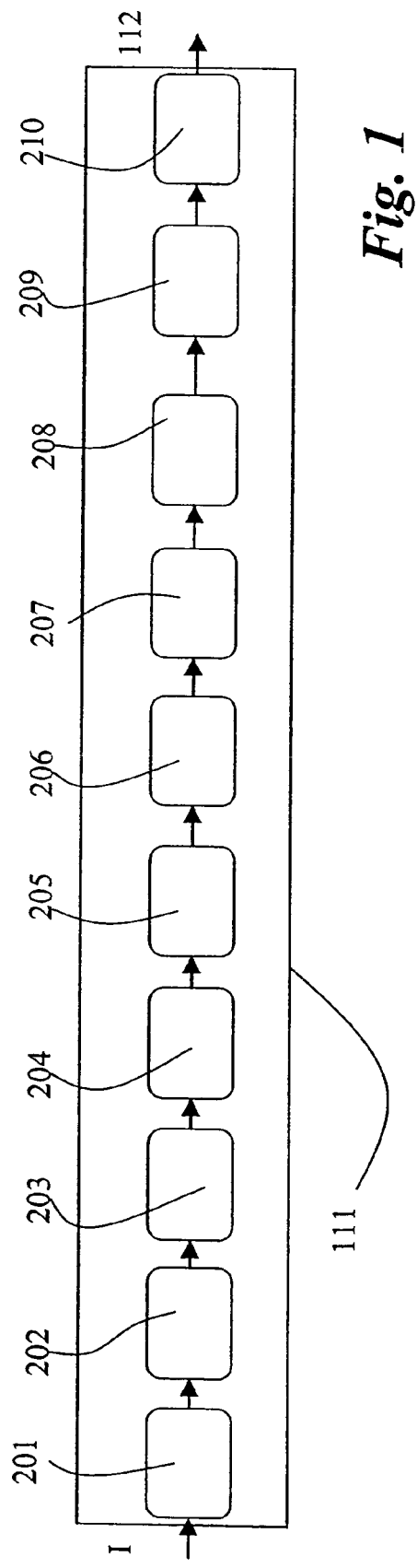
FIGS. 1 to 4 have already been described in the foregoing.
Figure 2:
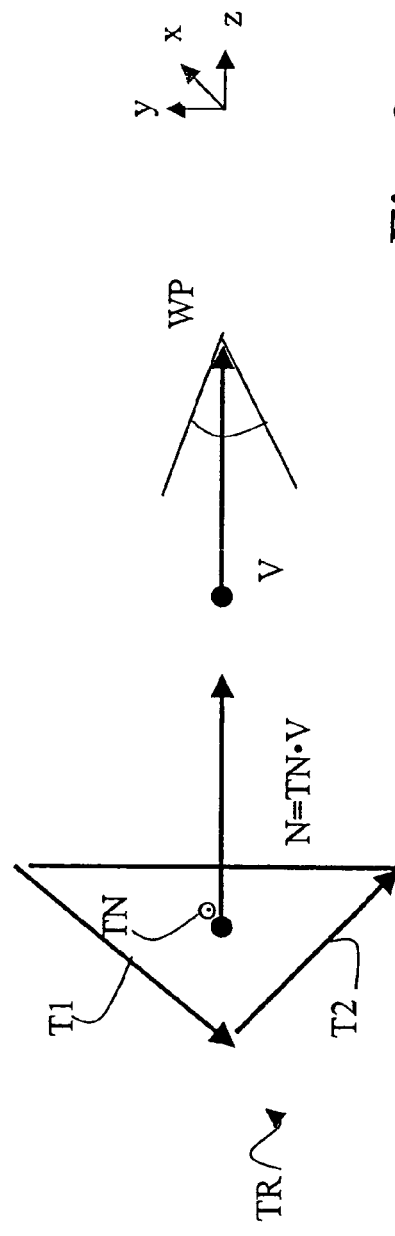
Figure 3:
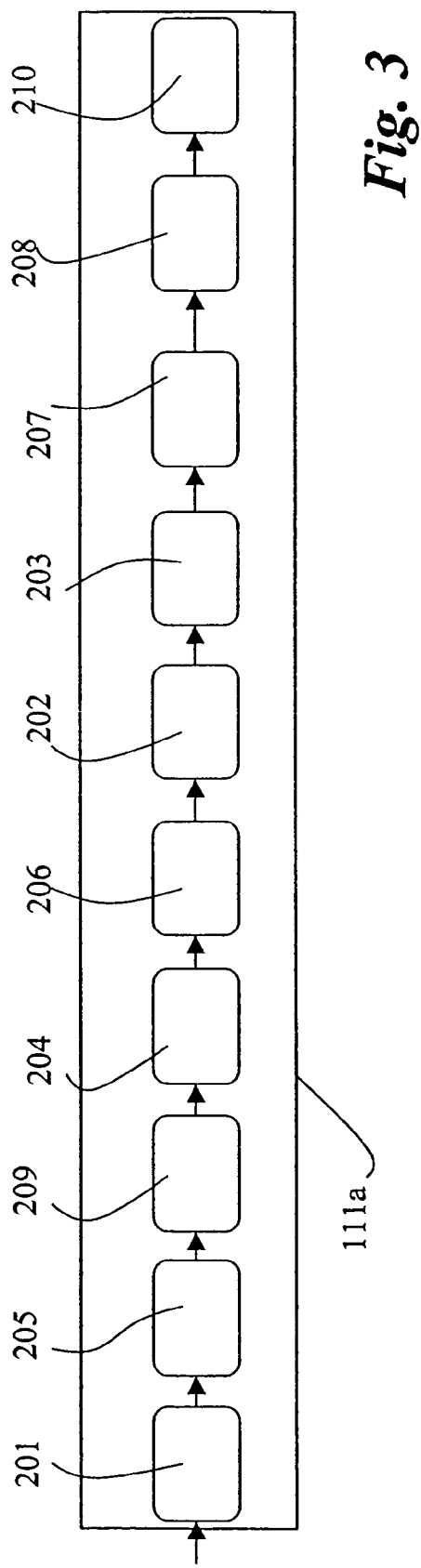
Figure 4:
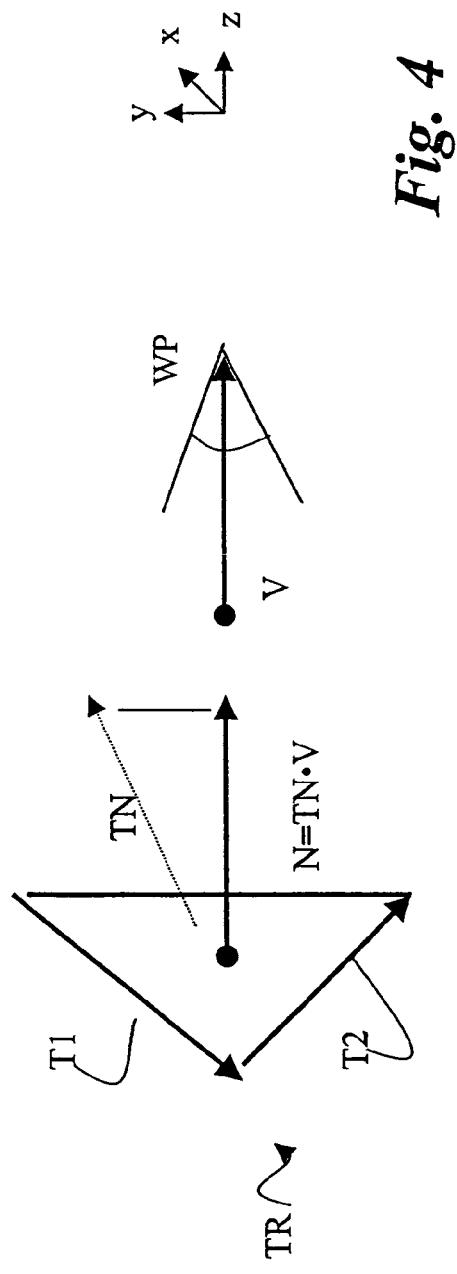

The circuit of FIG. 6 can also be used in association with the 3D back face culling method shown with reference to FIG. 3. In fact, the 4D back face culling as shown in FIG. 5 and 3D back face culling as shown in FIG. 3 use the same function with different inputs.

In four dimensions (4D):

$$P_{0w}P_{1w}P_{2w}N = ((P_{0x}(P_{1y}P_{2w} - P_{1w}P_{2y}) + P_{1x}(P_{0w}P_{2y} - P_{0y}P_{2w}) + P_{2x}(P_{1w}P_{0y} - P_{1y}P_{0w}))$$

In three dimensions (3D):

$$TN \cdot V = V_x(T_{1y}T_{2z} - T_{1z}T_{2y}) + V_y(T_{1x}T_{2z} - T_{1z}T_{2x}) + V_z(T_{1x}T_{2y} - T_{1y}T_{2x})$$

This possibility of exploiting the same circuit for 3D and 4D back face culling is particularly interesting in connection with OpenGL and NokiaGL software languages for computer graphics.

In fact, the geometry stage 111b just described is adapted to execute OpenGL or NokiaGL commands or instructions. The eye-viewpoint of the perspective projection is always the axes origin. The eye-viewpoint vector of the orthogonal projection is always parallel to the z-axis.

In OpenGL or NokiaGL there are only two types of projections admitted directly with a specific command: orthogonal and perspective projection.

If another projection is required, a corresponding projection matrix must be loaded by means of a load matrix command. This matrix is generic, and the 3D position of the eye-viewpoint is unknown, whereby 3D back face culling cannot be applied.

In the geometry stage 111b described herein:

if the user adopts a specific command to effect orthogonal or perspective projection, then the pipeline applies the 3D back face culling solution. In that case culling is operated upstream of the transform projection module, thus being more efficient than 4D culling;

if the user loads its own projection matrix, then the pipeline applies the 4D dimension back face culling solution.

The arrangement disclosed herein thus leads to significant advantages over previously known solutions.

Specifically, the arrangement described significantly reduces the overall mathematical operation count and number of primitives, i.e., triangles, to be processed by the 3D pipeline and in the geometry stage in particular: in fact, the number of primitives at the first stages of the pipeline is approximately halved, so that the workload and the power consumption in the subsequent pipeline stages are correspondingly reduced.

A further advantage is provided by the possibility of hardware implementation adapted for both 3D and 4D back face culling. A geometry stage adapted for use with different graphics language can thus be implemented with reduced hardware requirements.

Finally, the arrangement described gives rise to a back face culling module able to deal in a simplified manner with four dimensional coordinates.

It is therefore evident that, without prejudice to the underlying principle of the invention, the details and embodiment may vary, also significantly, with respect to what has been disclosed just by way of example without departing from the scope of the invention, as defined by the claims that follow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A geometric processing stage for a pipelined engine for processing video signals and generating therefrom processed video signal in space coordinates (S) adapted for display on a screen, said geometric processing stage comprising:
    a model view module for generating projection coordinates of primitives of said video signals in a view space, said primitives including visible and non-visible primitives;
    a back face culling module arranged downstream of said model view module for at least partially eliminating said non-visible primitives;
    a projection transform module for transforming coordinates of said video signals from said view space coordinates into normalized projection coordinates (P); and
    a perspective divide module for transforming coordinates of said video signals from said normalized projection (P) coordinates into said screen space coordinates (S); wherein;
    said back face culling module is arranged downstream of said projection transform module and operates on normalized projection (P) coordinates of said primitives;
    said perspective divide module is arranged downstream said back face culling module for transforming the coordinates of said video signals from said normalized projection (P) coordinates into said screen space coordinates (S); and
    wherein said back face culling module is configured for performing a perspective division (S=P/Pw) for transforming said screen coordinates (S) into said normalized projection (P) coordinates.

2. The processing stage of claim 1 wherein said back face culling module is configured for calculating a projection normal vector (N) of a primitive defined in said normalized projection (P) coordinates.

3. The processing stage of claim 2, further comprising a layer of multipliers for computing subproducts among components of said projection coordinates (P).

4. The processing stage of claim 2, further comprising a comparison circuit suitable for evaluating a sign of said projection normal vector (N) and issuing a signal (EN) enabling subsequent processing depending on said sign.

5. A geometric processing stage for a pipelined engine for processing video signals and generating therefrom processed video signal in space coordinates (S) adapted for display on a screen, said geometric processing stage comprising:
    a model view module for generating projection coordinates of primitives of said video signals in a view space, said primitives including visible and non-visible primitives;
    a back face culling module arranged downstream of said model view module for at least partially eliminating said non-visible primitives;
    a projection transform module for transforming coordinates of said video signals from said view space coordinates into normalized projection coordinates (P); and
    a perspective divide module for transforming coordinates of said video signals from said normalized projection (P) coordinates into said screen space coordinates (S); wherein;
    said back face culling module is arranged downstream of said projection transform module and operates on normalized projection (P) coordinates of said primitives; and
    said perspective divide module is arranged downstream said back face culling module for transforming the coordinates of said video signals from said normalized projection (P) coordinates into said screen space coordinates (S), wherein said back face culling module is configured for operating on:
    4D normalized projection (P) coordinates of said primitives as received from said projection transform module; and
    3D view space coordinates of said primitives as received from said model view module.

6. The processing stage of claim 5 wherein said back face culling module includes:
    a first layer of multipliers for computing first subproducts of components of said coordinates (P);
    a layer of subtraction nodes for computing differences of said subproducts of coordinates as computed in said first layer of multipliers;
    a second layer of multipliers for computing second subproducts of said differences as computed in said layer of subtraction nodes; and
    a summation node for summing said second subproducts as computed in said second layer of multipliers.

7. The processing stage of claim 5 wherein said back face culling module is further configured for performing a perspective division (S=P/Pw) for transforming said screen coordinates (S) into said normalized projection (P) coordinates.

8. A method of processing video signals and generating therefrom processed video signal in space coordinates (S) adapted for display on a screen, said method comprising:
    generating projection coordinates of primitives of said video signals in a view space, said primitives including visible and non-visible primitives;
    back face culling said primitives for at least partially eliminating said non-visible primitives;
    transforming coordinates of said video signals from said view space coordinates into normalized projection coordinates (P);
    transforming coordinates of said video signals from said normalized projection (P) coordinates into said screen space coordinates (S);
    operating said back face culling on said normalized projection (P) coordinates of said primitives; and
    transforming coordinates of said video signals as resulting from said back face culling from said normalized projection (P) coordinates into said screen space coordinates (S), wherein said back face culling includes perspective dividing (S=P/Pw) for transforming said screen coordinates (S) into said normalized projection (P) coordinates.

9. The method of claim 8 wherein said back face culling includes calculating a projection normal vector (N) of a primitive defined in said normalized projection (P) coordinates.

10. The method of claim 9, further comprising providing a layer of multipliers for computing subproducts among components of said projection coordinates (P).

11. The method of claim 9, further comprising evaluation a sign of said projection normal vector (N) and issuing a signal (EN) enabling subsequent processing depending on said sign.

12. A method of processing video signals and generating therefrom processed video signal in space coordinates (S) adapted for display on a screen, said method comprising:
generating projection coordinates of primitives of said video signals in a view space, said primitives including visible and non-visible primitives;
back face culling said primitives for at least partially eliminating said non-visible primitives;
transforming coordinates of said video signals from said view space coordinates into normalized projection coordinates (P);
transforming coordinates of said video signals from said normalized projection (P) coordinates into said screen space coordinates (S);
operating said back face culling on said normalized projection (P) coordinates of said primitives;
transforming coordinates of said video signals as resulting from said back face culling from said normalized projection (P) coordinates into said screen space coordinates (S); and
providing a back face culling module configured for performing said back face culling and configured for selectively operating on:
4D normalized projection (P) coordinates of said primitives as received from said projection transform module; and
3D view space coordinates of said primitives as received from said model view module.

13. The method of claim 12, further comprising:
including in said back face culling module a first layer of multipliers, a layer of subtraction nodes, a second layer of multipliers, and a summation node; and
computing via said first layer of multipliers subproducts of components of said coordinates (P);
computing via said layer of subtraction nodes differences of said subproducts of coordinates as computed in said first layer of multipliers;
computing via said second layer of multipliers second subproducts of said differences as computed in said layer of subtraction nodes; and
summing via said summation node said second subproducts as computed in said second layer of multipliers.

14. The method of claim 12 wherein said back face culling includes perspective dividing (S=P/Pw) for transforming said screen coordinates (S) into said normalized projection (P) coordinates.

15. An article of manufacture, comprising:
a computer program product loadable into a memory of a computer and having software code portions to perform the following if the product is run on the computer:
generate projection coordinates of primitives of a video signal in a view space, the primitives including visible and non-visible primitives;
back face cull the primitives to at least partially eliminate the non-visible primitives;
transform coordinates of the video signal from the view space coordinates into normalized projection coordinates;
operate the back face culling on the normalized projection coordinates of the primitives; and
transform coordinates of the video signal from the normalized projection coordinates into screen space coordinates, including transform coordinates of the video signals resulting from the back face culling from the normalized projection coordinates into the screen space coordinates, wherein the computer program product further has software code portions to perform the following:
compute, via first multipliers, first subproducts of components of the normalized projection coordinates;
compute, via subtraction nodes, differences of the first subproducts as computed by the first multipliers;
compute, via second multipliers, second subproducts of the differences as computed by the subtraction nodes; and
sum the second subproducts as computed by the second multipliers.

16. The article of manufacture of claim 15 wherein the computer program product further has software code portions to perform the following:
calculate a projection normal vector of a primitive defined in the normalized projection coordinates;
evaluate a sign of the projection normal vector; and
issue a signal enabling subsequent processing based on the sign.

17. The article of manufacture of claim 15 wherein the software code portions to perform said back face culling include software code portions to perform said back face culling on:
4D normalized projection (P) coordinates of said primitives as received from said projection transform module; and
3D view space coordinates of said primitives as received from said model view module.

18. An article of manufacture, comprising:
a computer program product loadable into a memory of a computer and having software code portions to perform the following if the product is run on the computer;
generate projection coordinates of primitives of a video signal in a view space, the primitives including visible and non-visible primitives;
back face cull the primitives to at least partially eliminate the non-visible primitives, wherein the software code portions to perform the back face culling includes software code portions to perform a perspective division;
transform coordinates of the video signal from the view space coordinates into normalized projection coordinates;
operate the back face culling on the normalized projection coordinates of the primitives; and
transform coordinates of the video signal from the normalized projection coordinates into screen space coordinates, including transform coordinates of the video signals resulting from the back face culling from the normalized projection coordinates into the screen space coordinates.

19. The article of manufacture of claim 18 wherein the computer program product further has software code portions to perform the following:
compute, via first multipliers, first subproducts of components of the normalized projection coordinates;
compute, via subtraction nodes, differences of the first subproducts as computed by the first multipliers;
compute, via second multipliers, second subproducts of the differences as computed by the subtraction nodes; and
sum the second subproducts as computed by the second multipliers.

20. The article of manufacture of claim 18 wherein the software code portions to perform said back face culling include software code portions to perform said back face culling on:
- 4D normalized projection (P) coordinates of said primitives as received from said projection transform module; and
- 3D view space coordinates of said primitives as received from said model view module.

21. A system to generate a processed video signal in space coordinates, the system comprising:
- means for transforming coordinates of the video signal from view space coordinates into normalized projection coordinates;
- means for generating projection coordinates of primitives of the video signals in a view space, the primitives including visible and non-visible primitives;
- means for back face culling the primitives for at least partially eliminating the non-visible primitives;
- means for transforming the coordinates of the video signals from the view space coordinates into normalized projection coordinates;
- means for operating the back face culling on the normalized projection coordinates of the primitives;
- means for transforming the coordinates of the video signals from the normalized projection coordinates into the screen space coordinates, including means for transforming the coordinates of the video signals as resulting from the back face culling from the normalized projection coordinates into the screen space coordinates;
- means for computing, via first multipliers, first subproducts of components of the normalized projection coordinates;
- means for computing, via subtraction nodes, differences of the first subproducts as computed by the first multipliers;
- means for computing, via second multipliers, second subproducts of the differences as computed by the subtraction nodes; and
- means for summing the second subproducts as computed by the second multipliers.

22. The system of claim 21, further comprising means for computing subproducts among components of the projection coordinates.

23. The system of claim 21, further comprising:
- means for calculating a projection normal vector of a primitive defined in the normalized projection coordinates;
- means for evaluating a sign of the projection normal vector; and
- means for providing a signal that enables subsequent processing based on the evaluated sign.

24. An apparatus to generate a processed video signal in space coordinates, the apparatus comprising:
- a first module to generate projection coordinates of primitives of the video signal in a view space;
- a second module operatively coupled downstream of the first module to transform coordinates of the video signal from the view space into normalized projection coordinates;
- a third module operatively coupled downstream of the second module to operate on the normalized projection coordinates of the primitives using back face culling, wherein the third module is configured to perform perspective division; and
- a fourth module operatively coupled downstream of the third module to transform coordinates of the video signal, as resulting from the back face culling, from the normalized projection coordinates into screen space coordinates.

25. The apparatus of claim 24 wherein the third module is configured to calculate a projection normal vector of a primitive defined in the normalized projection coordinates.

26. The apparatus of claim 25 wherein the third module includes:
- a first layer of multipliers to compute first subproducts of components of the normalized projection coordinates
- a layer of subtraction nodes operatively coupled to the first layer of multipliers to compute differences of the subproducts as computed in the first layer of multipliers;
- a second layer of multipliers operatively coupled to the layer of subtraction nodes to compute second subproducts of the differences as computed in the layer of subtraction nodes;
- a summation node operatively coupled to the second layer of multipliers to sum the second subproducts as computed in the second layer of multipliers; and
- a comparison circuit operatively coupled to the summation node to evaluate a sign of the projection normal vector and to issue a signal that enables subsequent processing based on the sign.

27. The apparatus of claim 24 wherein the primitives include visible and non-visible primitives, the third module being configured to at least partially eliminate some of the non-visible primitives.

28. A method to process a video signal, the method comprising:
- generating projection coordinates of primitives of the video signal in a view space;
- transforming coordinates of the video signal from the view space into normalized projection coordinates;
- operating on the normalized projection coordinates of the primitives using back face culling, wherein using back face culling includes performing perspective division; and
- transforming coordinates of the video signal, as resulting from the back face culling, from the normalized projection coordinates into screen space coordinates.

29. The method of claim 28 wherein using back face culling includes calculating a projection normal vector of a primitive defined in the normalized projection coordinates.

30. The method of claim 29, further comprising evaluating a sign of the projection normal vector and generating a signal to enable subsequent processing based on the evaluated sign.

31. The method of claim 28 wherein using the back face culling includes computing a plurality of subproducts.

* * * * *

UNITED STATES PATENT AND TRADEMARK OFFICE
CERTIFICATE OF CORRECTION

PATENT NO. : 7,236,169 B2
APPLICATION NO. : 10/886939
DATED : June 26, 2007
INVENTOR(S) : Barone et al.

It is certified that error appears in the above-identified patent and that said Letters Patent is hereby corrected as shown below:

<u>Column 13</u>
Lines 37-38, "computing via said first layer of multipliers subproducts of components of said coordinates (P);" should read as -- computing via said first layer of multipliers first subproducts of components of said coordinates (P); --

Signed and Sealed this

Seventeenth Day of June, 2008

JON W. DUDAS
*Director of the United States Patent and Trademark Office*